United States Patent Office 3,436,459
Patented Apr. 1, 1969

3,436,459
FAT SOLUBLE VITAMIN COMPOSITIONS
Heinrich Kläui, Riehen, Switzerland, assignor to Hoffmann-La Roche Inc., Nutley, N.J., a corporation of New Jersey
No Drawing. Filed Oct. 20, 1964, Ser. No. 405,287
Claims priority, application Switzerland, Nov. 1, 1963, 13,426/63
Int. Cl. A61k 15/02, 9/00
U.S. Cl. 424—284      8 Claims

ABSTRACT OF THE DISCLOSURE

Compositions containing fat soluble vitamins, a non-ionic emulsifying agent and an ionic wetting agent form clear stable solutios when admixed either with water, an aqueous solution of a polyol or an aqueous solution of a hydrocolloid, or mixtures thereof are described.

---

This invention relates, in general, to novel compositions and to a process for producing same. More particularly, the invention relates to aqueous solutions of lipophilic substances and to the manufacture thereof.

The use of non-ionic emulsifiers in the manufacture of aqueous solutions of lipophilic substances is well known in the art. Moreover, the use of non-ionic emulsifiers for such purpose has been described frequently in the literature. The employment of non-ionic emulsifying agents has a particular appeal in the pharmaceutical field since such emulsifiers solubilize fat-soluble vitamins, such as, vitamin A, vitamin D, vitamin E and vitamin $K_1$, and thus, serve to increase greatly the potential uses of these vitamins as well as other lipophilic substances.

Moreover, an additional advantage inheres in the use of non-ionic emulsifiers. It has been found that these emulsifiers are compatible with the numerous active substances and with the various adjuvant materials which are used both in the pharmaceutical industry and in the food and feedstuff field. For example, non-ionic emulsifiers are such that they are not normally influenced, to any great extent, by changes which may occur in the hydrogen ion concentration of a solution. Furthermore, the properties and characteristics of non-ionic emulsifiers are not altered by their use in combination with limited quantities of salts, such as, sodium chloride, sodium carbonate, etc.; or acids, such as, citric acid, etc.; or solvents, such as, alcohol, acetone, hexane, etc.; or polyols, such as, saccharose, glucose, glycerine, sorbitol, etc.

The foregoing notwithstanding, however, it is recognized that certain disadvantages inhere in the use of non-ionic emulsifying agents. In a number of instances, it has been found that solutions which have been prepared using non-ionic emulsifying agents are either unsatisfactory or, in the alternative, satisfactory only for a short period of time, since such solutions do not possess the requisite physical stability characteristics. For example, a rapid onset of opalescence or turbidity often appears when non-ionic emulsifying agents are present in preparations containing polyols, such as, sugar syrup, sorbitol syrup, glucose syrup, starch syrup, etc. or salts, such as, sodium chloride, sodium bicarbonate, etc., in relatively high concentrations. Furthermore, certain hydrophilic colloids, which are used as thickening agents, such as, water-soluble methyl cellulose, tragacanth, polyvinyl pyrrolidone, polyvinyl alcohol, guar and pectin, can also exert an adverse effect on the stability of solutions which contain non-ionic emulsifiers. The presence of active materials which are water-soluble, especially water-soluble vitamins, in the aforementioned syrups, can similarly exert an adverse effect on the stability of the product, depending upon the quantity thereof present therein. In all of these instances, a more or less distinct reduction in the emulsification properties of conventional non-ionic emulsifiers occurs as the polyol concentration of the product is increased. Such a reduction in the emulsifying action of non-ionic emulsifiers is particularly evident in the case of products having a polyol concentration in excess of about 30% by weight. During storage and, at times, immediately after the preparation thereof, the solution separates into layers, with a major portion of the lipophilic substance forming a cream with a major portion of the non-ionic emulsifier. This disintegration of the product occurs more rapidly at the higher temperatures which are unavoidably encountered in transit, in storage or under any other stress condition, for example, in accelerated stability tests. However, disintegration of the product can take place also at a slower rate, whereby the product loses its homogeneity gradually and continuously. For obvious reasons, a product having such stability characteristics is of questionable value either in the pharmaceutical field or in the food and feedstuff industries.

It has been found that the disadvantages described in the preceding paragraph can be eliminated, or at least substantially minimized, by the use of an ionic-, that is, an anionic, cationic or amphoteric, wetting agent in combination with a non-ionic emulsifying agent.

The invention herein is accordingly characterized by the use of lipophilic material in admixture with a non-ionic emulsifier and an ionic wetting agent. Compositions, produced as described herein, form clear solutions when admixed with water or aqueous solutions of polyalcohols and hydrocolloids. Furthermore, and in contrast to products, similarly prepared, which contain no ionic wetting agents, the preparations of this invention exhibit superior storage stability and temperature stability characteristics. The undesirable occurrence of opalescence, turbidity or disintegration, which is brought about particularly by the polyol content of the product, is substantially eliminated even at relatively high polyol concentrations. The compositions, thus obtained, are useful in the pharmaceutical field since they provide a completely utilizable dosage form for pharmaceutically active lipophilic substances. Moreover, the compositions are useful in the food and feedstuff industries since they provide a means whereby active substances, for example, fat-solubles can be incorporated into the diet of humans, animals and poultry.

The invention is, accordingly, concerned with clear solutions of lipophilic materials and with a process for producing same. This process is characterized in that a composition containing a lipophilic material and non-ionic emulsifying agent and ion-active wetting agents is mixed with an aqueous solution of a polyalcohol and/or a hydrocolloid. Variations in the precise technique of obtaining the present products are possible within the scope of the invention and such variations will be immediately apparent to persons skilled in the art. In general, the process comprises mixing the essential ingredients, that is, the hydrophilic substance, the non-ionic emulsifying agent and the ionic wetting agent, and incorporating the mixture, thus obtained, into a solution of polyalcohol and/or a hydrocolloid. The quantity of the non-ionic emulsifying agent and the quantity of the ionic-wetting agent, which is used in the practice of this invention, is variable within rather wide limits. For example, the non-ionic emulsifier can comprise from about 0.2% to about 90% by weight of the product produced while the concentration of the ionic wetting agent advantageously comprises from about 0.01% to about 2% by weight of the product.

In general, the present invention can be utilized as a means of preparing stable solutions containing any lipophilic substance. However, the invention is used, preferably, to obtain stable solutions of fat-soluble vitamins, such as, vitamin A; vitamin D; vitamin E, for example, α-tocopherol acetate; or vitamin $K_1$; lipophilic derivatives of water-soluble vitamins, such as, panthenol cetyl ether, pyridoxin tripalmitate, etc.; and compounds comprising the carotenoids series. Furthermore, aromatic essences and essential oils and oils, such as, castor oil, can be employed as the lipophilic material in the practice of this invention.

In general, any non-ionic emulsifier can be used in carrying out this invention. Especially well suited for use are non-ionic emulsifying agents containing polyoxyethylene groups. As specific examples of such non-ionic emulsifiers, polyoxyethylated castor oil, polyoxyethylenesorbitan monooleate and polyoxyethylene-polyoxypropylene ether, can be mentioned.

In combination with the non-ionic emulsifying agent, there is used an ionic-wetting agent, that is, a cation-active, amphoteric or anion-active wetting agent. Especially well suited for use are anionic surfactants, such as the sodium salt of sulphosuccinic acid dioctyl ester, as well as the corresponding di-hexyl ester; sodium lauryl sulfate; sodium isopropylnaphthalene sulfonate; glycochlocic acid sodium salt; taurocholic acid sodium salt; diethanolamine palmitate; polyoxyethylene octylphenol sulfonic acid sodium. Suitable cation active agents are β-phenoxyethyl-dimethyl-dodecylammonium bromide; trimethyldodecylammonium methosulfate; and trimethyl-octadecyl-ammonium methosulfate. Additionally, there can be used the amphoteric wetting agent consisting of a sulfonated fatty acid amide derivative with diluents.

In general, any polyol, which is normally used in the pharmaceutical and food or feedstuff industries can be employed in carrying out this invention. These include, for example, saccharose, sorbitol, glucose, invert sugar, starch syrup, glycerine and also hydrocolloidal methylcellulose, tragacanth, polyvinyl pyrrolidone, polyvinyl alcohol, pectin and/or guar. The water-soluble active materials which can be incorporated into the products of the invention include, for example, water-soluble vitamins, such as, ascorbic acid, vitamin $B_1$, vitamin $B_2$, vitamin $B_6$, nicotinic acid amide, etc.

For a fuller understanding of the nature and objects of this invention, reference may be had to the following examples which are given merely as further illustrations of the invention and are not to be construed in a limiting sense.

EXAMPLE 1

This example demonstrates the preparation of a water-free concentrate containing 200,000 I.U. of vitamin A per gram.

In producing the concentrate, 14.0 grams of vitamin A palmitate (containing 1.7 million I.U. of vitamin A per gram), 2.0 grams of sodium salt of sulphosuccinic acid dioctyl ester and 84.0 grams of a condensation product of castor oil with ethylene oxide (molecular weight about 2,700) were mixed in a suitable vessel at a temperature of about 60° C.

It was found that the concentrate, thus obtained, could be diluted with polyalcohol-containing solutions and that its physical stability, particularly its heat stability, was superior to that of a concentrate prepared, in a similar manner, with the same ingredients and same quantities, without the addition of the sodium salt or sulphosuccinic acid dioctyl ester.

EXAMPLE 2

This example demonstrates the preparation of an aqueous concentrate solution containing 100,000 I.U. of vitamin A per gram.

In producing this solution, 7.0 grams of vitamin A palmitate (containing 1.7 million I.U. of vitamin A per gram), 15.0 grams of glycerin, 25.0 grams of a polyoxyethylation product of castor oil and 1.0 gram of the sodium salt of sulphosuccinic acid dioctyl ester were mixed at a temperature of about 50° C. Thereafter, this mixture was diluted with 52.0 grams of distilled water at a temperature of about 70° C. Subsequently, the product was allowed to cool at room temperature.

The addition of 10.0 grams of the product described in the preceding paragraph to 90.0 grams of glycerin (90% by weight) yielded a clear solution. A solution similarly prepared, using an aqueous concentrate solution which was in all respects comparable to that described in the preceding paragraph, but which did not contain the sodium salt of sulphosuccinic acid dioctyl ester, was turbid and it disintegrated even with a slight increase in temperature.

EXAMPLE 3

This example demonstrates the preparation of a vitamin E concentrate containing 30% by weight of vitamin E.

The concentrate was produced by mixing, at a temperature of about 70° C., 33.0 grams of tocopherol acetate, 2.0 grams of the sodium salt of sulphosuccinic acid dioctyl ester and 65.0 grams of a polyoxyethylation product of castor oil.

The concentrate, thus obtained, was found to be suitable for dilution with syrups. For example, when 300 mg. of the concentrate was diluted with 10 ml. of an aqueous sugar solution (64% by weight), a clear solution was obtained. In contrast, a concentrate produced in a similar manner using the same ingredients and the same quantities thereof as were employed in formulating the concentrate of this example, but without the sodium salt of sulphosuccinic acid dioctyl ester, exhibited a striking blue opalescence.

EXAMPLE 4

This example demonstrates the production of a syrup containing both vitamin A and vitamin C.

In producing this syrup, 350 mg. of vitamin A palmitate (containing 1.7 million I.U. of vitamin A per gram), 1.3 gram of a polyoxyethylation product of castor oil and 0.1 gram of the sodium salt of sulphosuccinic acid dioctyl ester were mixed at a temperature of about 60° C. Thereafter, 9.6 grams of water, heated to a temperature of about 70° C., was added to, and stirred into, the mixture. The product was then allowed to cool. When cool, the product was mixed with 84.0 grams of an invert sugar syrup (containing 42% invert sugar and 25% saccharose) in which 5.0 grams of ascorbic acid had been dissolved previously.

The product, produced as described herein, was obtained in the form of a substantially clear syrup. A product similarly prepared, but using no sodium salt of sulphosuccinic acid dioctyl ester, was turbid.

EXAMPLE 5

This example is induced herein to demonstrate the production of a multivitamin syrup.

In producing this syrup, 70 mg. of vitamin A palmitate (containing 1.7 million I.U. of vitamin A per gram), 10,000 I.U. of vitamin $D_3$, 0.5 gram of polyoxyethylene sorbitan monooleate and 0.1 gram of the sulphosuccinic acid dioctyl ester were mixed and, subseuently, the mixture was stirred with 10 ml. of water, heated to a temperature of about 70° C. In a separate vessel, 0.05 gram of vitamin $B_1$ (in the form of its hydrochloride), 0.05 gram of vitamin $B_6$ (in the form of its hydrochloride), 0.05 gram of vitamin $B_2$ (in the form of its phosphate), 1.0 gram of ascorbic acid and 0.5 gram of nicotinic acid amide were dissolved in 10 ml. of water. Thereafter, the latter solution was admixed with the aqueous solution containing vitamin A and vitamin $D_3$ described heretofore. Subsequently, 1.0 gram of methylcellulose (4,000 cps./70 Hg.) were dissolved in 20 ml. of water and such solutions was added to the mixture. The mixture was then made up to a volume of 100 ml. using invert sugar syrup.

There was, thus obtained, a physically stable syrup. In contrast, a syrup similarly prepared without the use of the sodium salt of sulphosuccinic acid dioctyl ester, was characterized in that, upon standing, the vitamin A component thereof formed a cream.

EXAMPLE 6

This example is included herein to demonstrate the preparation of a vitamin $K_1$ solution.

In preparing this solution, 12 mg. of vitamin $K_1$, 22 mg. of a polyoxyethylation product of castor oil, 10 mg. of glycerin and 1 mg. of $\beta$-phenoxyethyl-dimethyl-dodecyl ammonium bromide were mixed at a temperature of 60° C., following which the mixture was made up to a volume of 1 ml. with water, while stirring.

A homogeneous solution was thus obtained. The solution remained homogeneous even when it was sterilized for a period of twenty minutes at a temperature of 120° C. In contrast, a solution similarly prepared without, however, the addition of the $\beta$-phenoxyethyl-dimethyl-dodecyl ammonium bromide was turbid and it separated when heated at a temperature even below 100° C.

EXAMPLE 7

This example demonstrates the production of another vitamin $K_1$ solution.

In producing the solution, 12.0 mg. of vitamin $K_1$, 22 mg. of a polyoxyethylation product of castor oil, 10 mg. of glycerin and 1 mg. of sodium lauryl sulfate was mixed at a temperature of 60° C. and, thereafter, the mixture was made up to a volume of 1.0 ml. by the addition of water with stirring.

The product, thus obtained, was homogeneous and it remained so even when sterilized for a period of about twenty minutes at a temperature of about 120° C. On the other hand, a solution similarly prepared, without the addition of the sodium lauryl sulfate was turbid and separated when heated even at temperatures below 100° C.

EXAMPLE 8

This example is included herein to demonstrate the preparation of a syrup containing 50,000 I.U. of vitamin A per 5 ml.

In producing this syrup, 10.0 mg. of orange oil, 600 mg. of vitamin A palmitate (containing 1.7 million I.U. of vitamin A per gram), 2.5 grams of a polyoxyethylation product of castor oil, 0.3 gram of Miranol CS and 1.5 gram of glycerin were mixed at a temperature of about 50° C. and 6.0 grams of water, heated to a temperature of about 70° C., were stirred therein. The component, Miranol CS, used herein, is an amphoteric wetting agent marketed and sold by Miranol Chemical Corporation, Irvington, N.J.

The solution, which was thus obtained, was cooled with stirring and 90.0 grams of invert sugar syrup (containing 40% invert sugar and 25% saccharose) was added thereto.

The product was obtained in the form of a clear solution. A product, similarly prepared, but without using Miranol CS, was turbid and it separated upon a slight increase in temperature.

I claim:

1. A composition comprising (1) fat soluble vitamins, (2) a non-ionic emulsifying agent selected from the group consisting of a polyoxyethylation product of castor oil and polyoxyethlyene sorbitan monooleate and (3) an ionic-wetting agent selected from the group consisting of the sodium salt of sulphosuccinic acid dioctyl ester and sodium lauryl sulfate, said composition forming a clear solution when admixed with a vehicle selected from the group consisting of water, an aqueous solution of a poly-alcohol, an aqueous solution of a pharmaceutically acceptable hydrophilic hydrocolloid selected from the group cinsisting of methylcellulose, tragacanth, polyvinyl pyrrolidone, polyvinyl alcohol, pectin and guar and mixtures thereof.

2. A composition comprising (1) vitamin A palmitate, (2) a non-ionic emulsifying agent selected from the group consisting of a polyoxyethylation product of castor oil and polyoxyethylene sorbitan monooleate and (3) an ionic wetting agent selected from the group consisting of the sodium salt of sulphosuccinic acid dioctyl ester and sodium lauryl sulfate, said composition forming a clear solution when admixed with a vehicle selected from the group consisting of water, an aqueous solution of a polyalcohol, an aqueous solution of a pharmaceutically acceptable hydrophilic hydrocolloid selected from the group consisting of methylcellulose, tragacanth, polyvinyl pyrrolidone, polyvinyl alcohol, pectin and guar and mixtures thereof.

3. A composition comprising (1) $\alpha$-tocopheryl acetate, (2) a non-ionic emulsifying agent selected from the group consisting of a polyoxy-ethylation product of castor oil and polyoxyethylene sorbitan monooleate and (3) an ionic wetting agent selected from the group consisting of the sodium salt of sulphosuccinic acid dioctyl ester and sodium lauryl sulfate, said composition forming a clear solution when admixed with a vehicle selected from the group consisting of water, an aqueous solution of a poly-alcohol, an aqueous solution of a pharmaceutically acceptable hydrophilic hydrocolloid selected from the group consisting of methylcellulose, tragacanth, polyvinyl pyrrolidone, plyvinyl alcohol, pectin and guar and mixtures thereof.

4. A clear solution comprising an aqueous vehicle having dissolved therein (1) fat soluble vitamins (2) a non-ionic emulsifying agent selected from the group consisting of a polyoxyethylation product of castor oil, and polyoxyethylene sorbitan monooleate and (3) an ionic-wetting agent selected from the group consisting of the sodium salt of sulphosuccinic acid dioctyl ester and sodium laurly sulfate.

5. The composition of claim 4 wherein the aqueous vehicle is water.

6. The composition of claim 4 wherein the aqueous vehicle is an aqueous solution of a pharmaceutically acceptable hydrophilic hydrocolloid selected from the group consisting of methylcellulose, tragacanth, polyvinyl pyrrolidone, polyvinyl alcohol, pectin and guar and mixtures thereof.

7. The composition of claim 4 wherein the aqueous vehicle is an aqueous solution of a polyalcohol.

8. The composition of claim 7 wherein the polyalcohol is a member selected from the group consisting of glycerine, sucrose, invert sugar, starch syrup, sorbitol and glucose.

References Cited

UNITED STATES PATENTS

| | | |
|---|---|---|
| 3,070,499 | 12/1962 | Mullins et al. |
| 3,102,078 | 8/1963 | Robeson. |
| 3,252,864 | 5/1966 | Klaui. |
| 3,252,865 | 5/1966 | Klaui. |

OTHER REFERENCES

Remington's Practice of Pharmacy, 11th ed., pp. 186–192.

RICHARD L. HUFF, Primary Examiner.

U.S. Cl. X.R.

424—236, 252, 255, 263, 280, 312, 331, 344, 358, 361, 365